United States Patent
Liu

(10) Patent No.: US 11,143,757 B2
(45) Date of Patent: Oct. 12, 2021

(54) ENVIRONMENTAL DETECTION DEVICE AND ENVIRONMENTAL DETECTION METHOD USING THE SAME

(71) Applicant: QUANTA COMPUTER INC., Taoyuan (TW)

(72) Inventor: Chien-Hung Liu, Taoyuan (TW)

(73) Assignee: QUANTA COMPUTER INC.

(*) Notice: Subject to any disclaimer, the term of this patent is extended or adjusted under 35 U.S.C. 154(b) by 479 days.

(21) Appl. No.: 16/264,209

(22) Filed: Jan. 31, 2019

(65) Prior Publication Data

US 2020/0158866 A1 May 21, 2020

(30) Foreign Application Priority Data

Nov. 19, 2018 (TW) .................. 107141120

(51) Int. Cl.
 *H04R 1/34* (2006.01)
 *H04R 1/02* (2006.01)
 *G01S 15/08* (2006.01)
 *G01S 15/86* (2020.01)

(52) U.S. Cl.
 CPC .............. *G01S 15/08* (2013.01); *G01S 15/86* (2020.01); *H04R 1/025* (2013.01); *H04R 1/345* (2013.01)

(58) Field of Classification Search
 CPC ......... G01S 15/08; G01S 15/86; H04R 1/025; H04R 1/345

USPC .......................................................... 367/99
See application file for complete search history.

(56) References Cited

U.S. PATENT DOCUMENTS

| | | | |
|---|---|---|---|
| 10,237,644 B1* | 3/2019 | Wang | H04R 29/00 |
| 2007/0024431 A1* | 2/2007 | Touge | B60Q 9/00 340/436 |
| 2009/0009490 A1* | 1/2009 | Yang | G06F 3/043 345/179 |
| 2019/0154439 A1* | 5/2019 | Binder | G01S 15/08 |
| 2021/0239831 A1* | 8/2021 | Shin | H04R 1/08 |

FOREIGN PATENT DOCUMENTS

| | | |
|---|---|---|
| CN | 1564016 A | 1/2005 |
| CN | 105974420 A | 9/2016 |
| CN | 106772249 A | 5/2017 |

* cited by examiner

*Primary Examiner* — Sean H Nguyen
(74) *Attorney, Agent, or Firm* — Innovation Counsel LLP

(57) ABSTRACT

An environment detection method includes the following steps is provided. Firstly, an ultrasonic wave is emitted to a first reflecting cone by an ultrasonic transmitter, wherein the ultrasonic wave is reflected to the environment by the first reflecting cone in a full circumferential direction. Then, the ultrasonic waves reflected back from a second reflecting cone is received by an ultrasonic receiver. Then, a received signal waveform received by the ultrasonic receiver is recorded by a controller.

10 Claims, 7 Drawing Sheets

ENVIRONMENTAL DETECTION DEVICE AND ENVIRONMENTAL DETECTION METHOD USING THE SAME

This application claims the benefit of Taiwan application Serial No. 107141120, filed Nov. 19, 2018, the subject matter of which is incorporated herein by reference.

BACKGROUND OF THE INVENTION

Field of the Invention

The invention relates in general to an environment detection device and an environment detection method using the same, and more particularly to an environment detection method using ultrasonic wave and an environment detection method using the same.

Description of the Related Art

The generally known distance measuring device calculates a distance between a distance measuring device and an obstacle according to an emission time and a reflection time of ultrasonic waves emitted towards the same direction in parallel by an ultrasonic transmitter and an ultrasonic receiver. However, such design can only detect obstacles in the same direction, and the application of the distance measuring device is therefore greatly limited. Therefore, it has become a prominent task for the industries to provide a new distance measuring device to resolve the above problems.

SUMMARY OF THE INVENTION

The invention is directed to an environment detection device and an environment detection method using the same capable of resolving the generally known problems disclosed above.

According to one embodiment of the present invention, an environment detection device is provided. The environment detection device includes an ultrasonic transmitter, a first reflecting member, an ultrasonic receiver and a second reflecting member. The ultrasonic transmitter is configured to emit an ultrasonic wave. The first reflecting member has a first reflecting cone configured to reflect the ultrasonic wave to an environment in a full circumferential direction. The second reflecting member has a second reflecting cone configured to reflect the ultrasonic wave reflected back from the environment to the ultrasonic receiver. The controller is electrically connected to the ultrasonic receiver and configured to record a received signal waveform of the ultrasonic wave received by the ultrasonic receiver.

According to another embodiment of the present invention, an environment detection method includes the following steps is provided. Firstly, an ultrasonic wave is emitted to a first reflecting cone by an ultrasonic transmitter, wherein the ultrasonic wave is reflected to the environment by the first reflecting cone in a full circumferential direction. Then, the ultrasonic waves reflected back from a second reflecting cone is received by an ultrasonic receiver. Then, a received signal waveform received by the ultrasonic receiver is recorded by a controller.

The above and other aspects of the invention will become better understood with regard to the following detailed description of the preferred but non-limiting embodiment (s). The following description is made with reference to the accompanying drawings.

DETAILED DESCRIPTION OF THE INVENTION

Figure 1A:
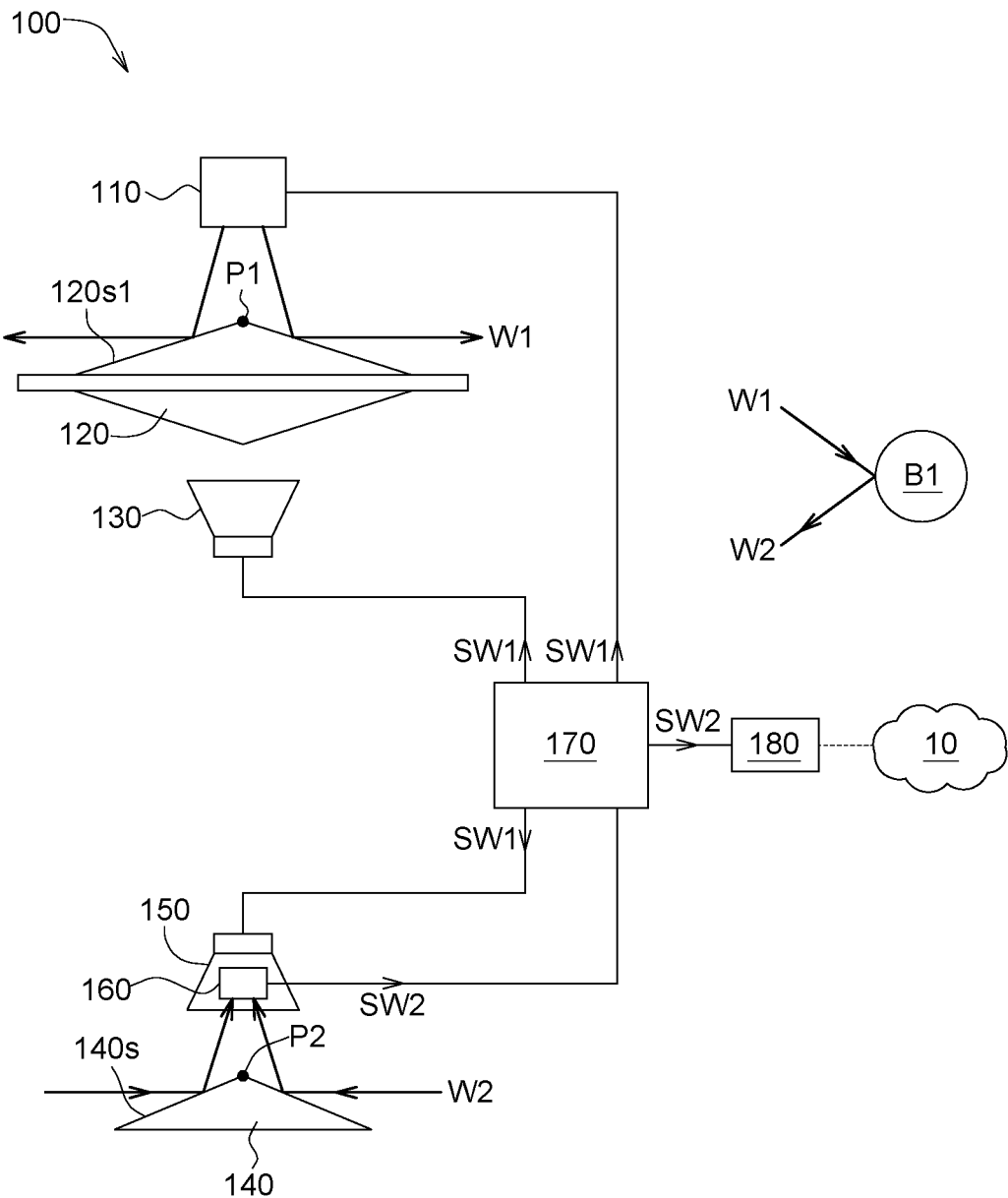
FIG. 1A is a schematic diagram of an environment detection device according to an embodiment of the present invention.
Figure 1B:
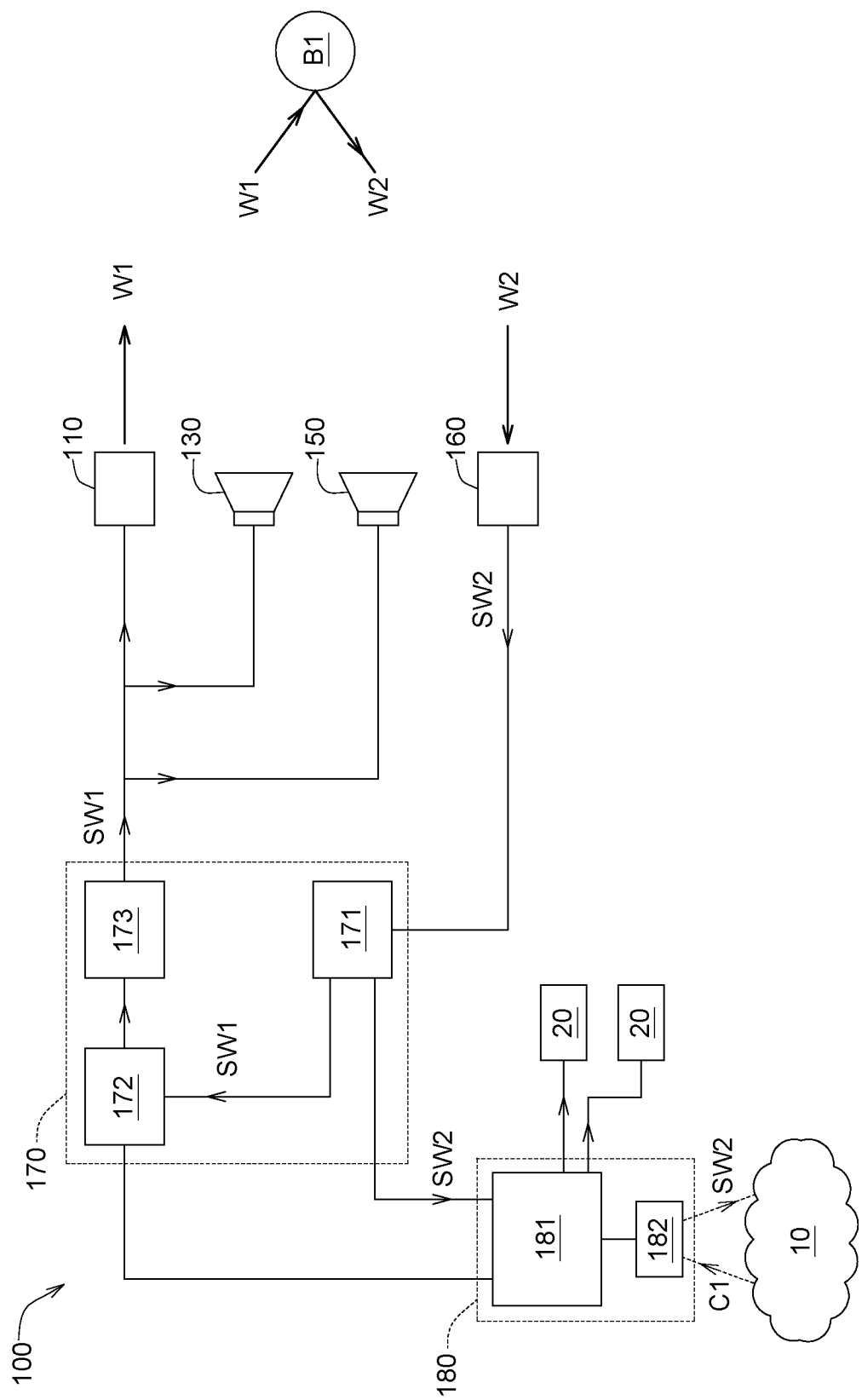
FIG. 1B is a functional block diagram of the environment detection device of FIG. 1A.
Figure 1C:
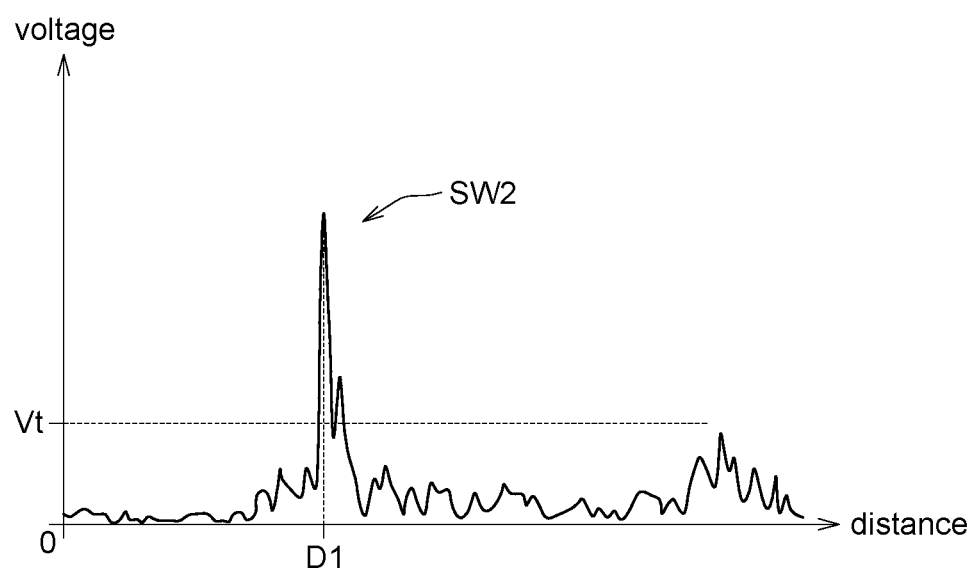
FIG. 1C is a schematic diagram of the received signal waveform of FIG. 1A.

Refer to FIGS. 1A-1C. FIG. 1A is a schematic diagram of an environment detection device 100 according to an embodiment of the present invention. FIG. 1B is a functional block diagram of the environment detection device 100 of FIG. 1A. FIG. 1C is a schematic diagram of the received signal waveform SW2 of FIG. 1A. The environment detection device 100 can be realized by an ultrasonic distance measuring device capable of detecting space distribution in the environment and playing music.

The environment detection device 100 includes an ultrasonic transmitter 110, a first reflecting member 120, a wave guide member 125, a first speaker 130, a second reflecting member 140, a second speaker 150, an ultrasonic receiver 160, a circuit board 170 and a control module 180. As indicated in FIG. 1B, the circuit board 170 at least includes a controller 171, a mixer 172 and an amplifier 173, wherein the controller 171 is electrically connected to the mixer 172 and the amplifier 173. The controller 171, the mixer 172 and the amplifier 173 can be realized by circuit structures formed using semiconductor manufacturing process, and at least two of the controller 171, the mixer 172 and the amplifier 173 can be integrated as one circuit structure. The control module 180 at least includes a processor 181 and a communication element 182, wherein the processor 181 is electrically connected to the communication element 182. The processor 181 and the communication element 182 can be realized by circuit structures formed using semiconductor manufacturing process, and the processor 181 and the communication element 182 can be integrated as one circuit structure. In another embodiment, the processor 181 and the communication element 182 can be disposed in the circuit board 170 or integrated to the controller 171 of the circuit board 170.

As indicated in FIG. 1A, the ultrasonic transmitter 110 is configured to emit an ultrasonic wave W1. The ultrasonic transmitter 110, which can be an ultrasonic transceiver, is not limited to emitting an ultrasonic wave. The first reflecting member 120 has a first reflecting cone 120s1 configured to reflect the ultrasonic wave W1 to the environment in a full circumferential direction. In the present specification, the "full circumferential direction" refers to the ultrasonic wave W1 being broadcasted towards the environment in 360° (from an overlooking direction of FIG. 1A), and such ultrasonic wave is also referred as ring field ultrasonic wave. In the present specification, the "environment" can be the interior space of a building such as an office building, a residential building or a restaurant. As indicated in FIG. 1A, the wave guide member 125 is laterally protruded over a lateral side of the first reflecting member 120, such that the ultrasonic wave W1 reflected from the first reflecting member 120 can contact the wave guide member 125 to be transmitted to the environment in a full circumferential direction. The first reflecting member 120 and the wave guide member 125 can be integrally formed in one piece or can be separately formed beforehand and then assembled together. In terms of material, the first reflecting member 120 and/or the wave guide member 125 can be formed of plastics or suitable conductive material. Besides, the cone point P1 of the first reflecting cone 120s1 can be aligned with the central position of the ultrasonic transmitter 110, such that most or all of the intensity of the ultrasonic wave W1 received by the first reflecting cone 120s1 can be reflected to the ultrasonic transmitter 110.

When the ultrasonic wave W1 transmitted to the environment contacts the reflecting object B1, the ultrasonic wave W1 will be reflected back from the reflecting object B1. The reflecting object B1 can be an object which can reflect the ultrasonic wave in the environment. The object can be a biological object (such as a human or an animal) or a non-biological object (such as a wall, a furniture or an appliance). The second reflecting member 140 has a second reflecting cone 140s configured to reflect the ultrasonic wave W2 reflected back from the environment. The ultrasonic receiver 160 is configured to receive the ultrasonic wave W2 received from the second reflecting member 140. The ultrasonic receiver 160 is not limited to receiving the ultrasonic wave only, and can also be realized by an ultrasonic transceiver. The controller 171 (illustrated in FIG. 1B) is electrically connected to the ultrasonic receiver 160 and configured to record the received signal waveform SW2 of the ultrasonic receiver 160. Thus, the position or position change of the reflecting object B1 in the environment can be detected using the ultrasonic wave W1. Besides, the second reflecting member 140 can be formed of plastics.

In the present embodiment, the cone point P2 of the second reflecting cone 140s can be aligned with the central region of the second speaker 150, such that most or all of the intensity of the ultrasonic wave W2 reflected from the second reflecting cone 140s can be reflected to the central region of the second speaker 150. Besides, the ultrasonic receiver 160 can be disposed at the central region of the second speaker 150 to receive the ultrasonic wave W2 having stronger or strongest intensity.

In the present embodiment, the ultrasonic receiver 160 and the second speaker 150 can be integrated as one component. For example, one speaker of a speaker-in-speaker assembly can be replaced by the ultrasonic receiver 160, and the other speaker of the speaker-in-speaker assembly is the second speaker 150, but the embodiment of the present invention is not limited thereto.

As indicated in FIG. 1C, the received signal waveform SW2 is the waveform transformed from the ultrasonic wave W2 received by the ultrasonic receiver 160. In the diagram, the horizontal axis represents distance, and the vertical axis represents voltage change. For example, when the voltage of the received signal waveform SW2 (such as the surge illustrated in the diagram) is over a threshold voltage value Vt, this indicates that the ultrasonic receiver 160 receives the reflected ultrasonic wave W2, wherein the distance value D1 corresponding to the surge of the received signal waveform SW2 is the distance between the reflecting object B1 and the environment detection device 100. When the voltage of the received signal waveform SW2 is lower than the threshold voltage value Vt, this indicates that the signal received by the ultrasonic receiver 160 is not the reflected ultrasonic wave W2 but a noise in the environment. The controller 171 of the circuit board 170 can record the received signal waveform SW2 and transmit the received signal waveform SW2 to the processor 181 of the circuit board 180. The processor 181 transmits the received signal waveform SW2 to the cloud server 10 through the communication element 182. The communication element 182 can transmit the received signal waveform SW2 to the cloud server 10 using suitable wireless transmission technology.

As indicated in FIG. 1B, the cloud server 10 is configured to: (1) analyze the received signal waveform SW2 to obtain an environment information of the environment, such as the position of the reflecting object B1 in the environment; and (2) to emit a control signal C1 to the processor 181 according to the environment information. For example, if the environment information shows that the position of the reflecting object B1 changes, then the cloud server 10 emits the control signal C1 corresponding to the position change to the processor 181. The processor 181 receives the control signal C1 through the communication element 182. The processor 181 or the controller 171 is configured to control the function of at least one electronic device 20 according to the control signal C1. The electronic device 20 can be an electronic element built in the environment detection device 100 or an electronic element disposed outside the environment detection device 100. The electronic device 20 can be realized by a light source (such as an ambient light or a night light), an appliance (such as an air cleaner) or an Internet of Things (IoT). In another embodiment, the processor 181 can control the function of the first speaker 130 and/or the second speaker 150, such as the on/off function and the volume function, according to the control signal C1.

In an embodiment, the environment detection device 100 transmits multiple received signal waveforms SW2 to the cloud server 10 within a time interval. In the present specification, the "time interval" can be any time interval between 10~30 milliseconds. The cloud server 10 can analyze a space size in the environment, and/or a position distribution and/or a dynamic position change of at least one reflecting object B1 in the environment according to the change in the received signal waveforms SW2. The cloud server 10 further emits a corresponding control signal C1 to the processor 181 according to the position distribution and/or the dynamic position change of the reflecting object B1 in the environment. For example, when the reflecting object B1 leaves the environment, the control signal C1 is a signal for turning off the light source, and the processor 181 disables the light source to save power.

In another embodiment, the step and/or the function performed by the cloud server 10 can also be performed by the processor 181 and/or the circuit board 170. Under such design, the environment detection device can selectively omit the communication element 182 or even can omit the processor 181.

The operation of the controller 171 controlling the ultrasonic transmitter 110 to emit the ultrasonic wave W1 is disclosed below.

As indicated in FIG. 1B, the controller 171 emits an ultrasonic control signal SW1. The ultrasonic control signal SW1, after passing through the mixer 172 and the amplifier 173 in sequence, is transmitted to the ultrasonic transmitter 110, the first speaker 130 and the second speaker 150. Since the ultrasonic control signal SW1 is a UHF signal whose frequency is over 20 KHz, only the ultrasonic transmitter 110 among the ultrasonic transmitter 110, the first speaker 130 and the second speaker 150 can emit the ultrasonic wave W1 according to the ultrasonic control signal SW1.

In the present embodiment, in the absence of play music request and/or other control request, the environment detection device 100 can selectively omit the first speaker 130 and/or the second speaker 150 or can even omit the first speaker 130, the second speaker 150 and the mixer 172.

Figure 2A:
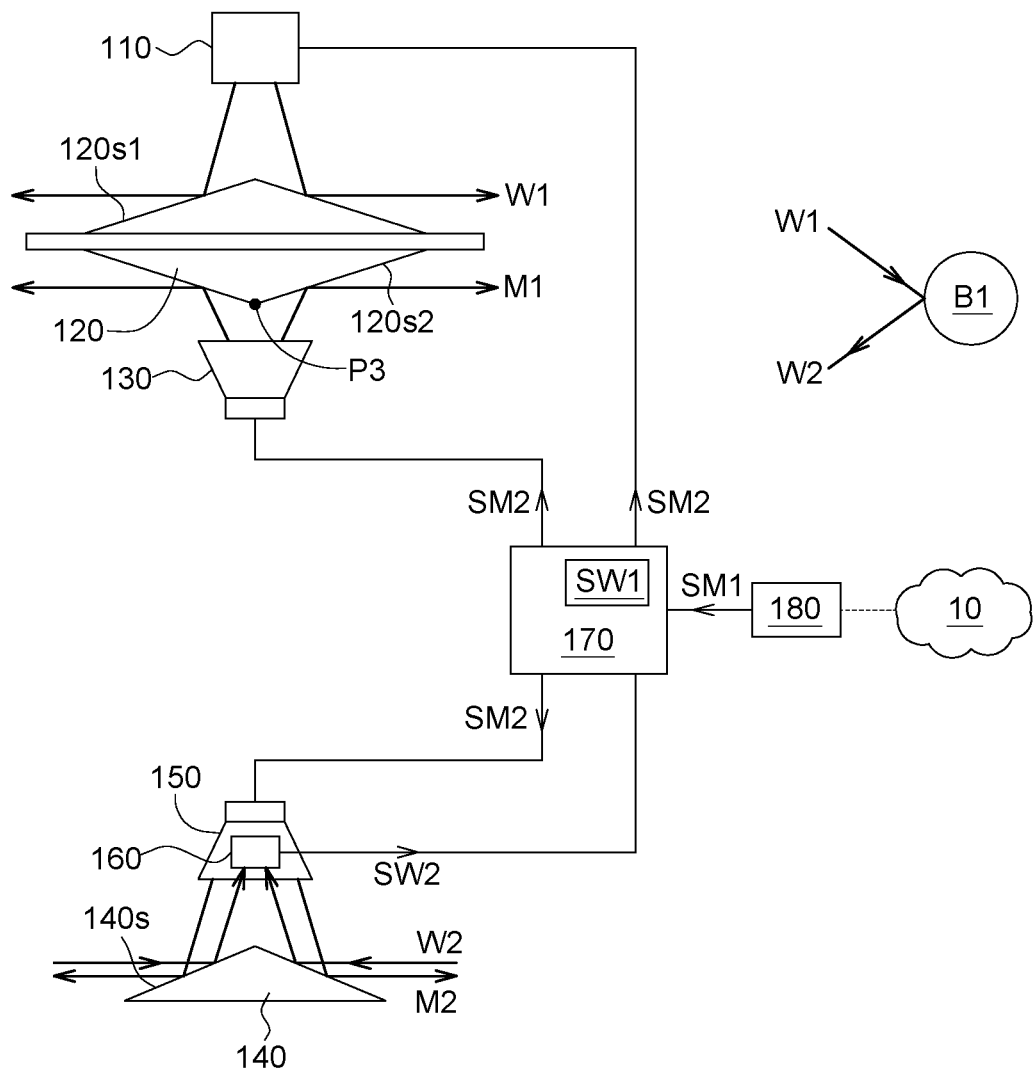
FIG. 2A is a schematic diagram of an environment detection device according to another embodiment of the invention.
Figure 2B:
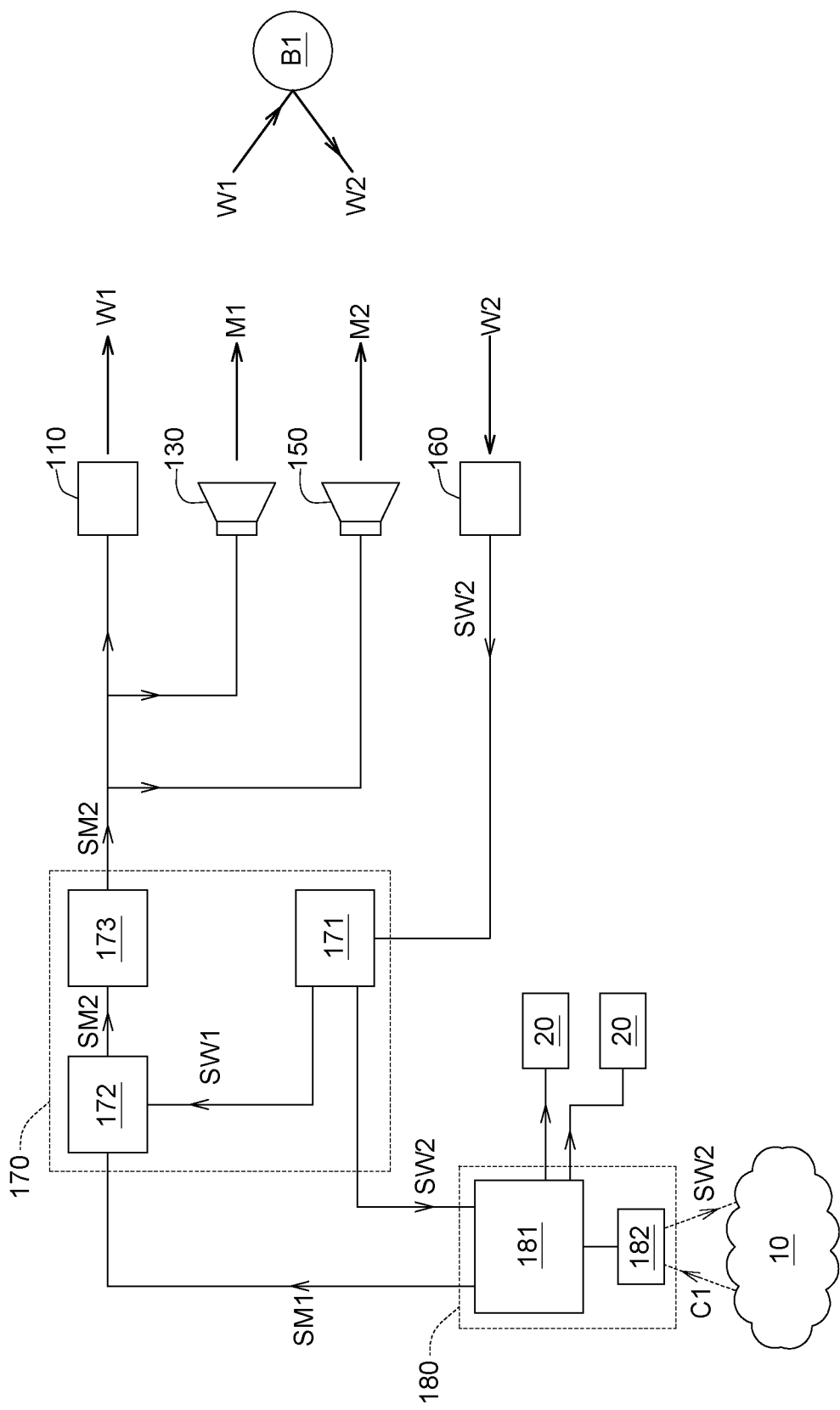
FIG. 2B is a functional block diagram of the environment detection device of FIG. 2A.

Refer to FIGS. 2A-2B. FIG. 2A is a schematic diagram of an environment detection device 100 according to another embodiment of the invention. FIG. 2B is a functional block diagram of the environment detection device 100 of FIG. 2A. Unlike the environment detection device 100 of the above embodiment, the environment detection device 100 of the present embodiment can concurrently emit an ultrasonic wave and play music.

As indicated in FIG. 2A, the first speaker 130 is electrically connected to the controller 171 and configured to emit a first music M1. The first reflecting member 120 further has a third reflecting cone 120s2. The third reflecting cone 120s2 faces the first speaker 130 and is configured to reflect the first music M1 to the environment in a full circumferential direction. For example, the third reflecting cone 120s2 and the first reflecting cone 120s1 are located on two opposite sides of the wave guide member 125. The cone point P3 of the third reflecting cone 120s2 can be aligned with the central region of the first speaker 130, such that most or all of the intensity of the first music M1 received by the third reflecting cone 120s2 can be reflected to the first speaker 130.

The second speaker 150 is electrically connected to the controller 171 and configured to emit a second music M2. The second reflecting cone 140s faces the second speaker 150 and is configured to reflect the second music M2 to the environment in a full circumferential direction. In the present embodiment, the cone point P1 of the second reflecting cone 140s is aligned with the central position of the second speaker 150, such that the second music M2 emitted from the second speaker 150 can be broadcasted to the tapered surface of the cone point P1 to be reflected to the environment in a full circumferential direction. In an embodiment, the music signal SM1 of the first music M1 and the second music M2 can be received from an external device (such as the cloud server 10), other device outside the environment detection device 100 (such as a flash drive, a mobile phone, or a computer), or the circuit board 170. Besides, the external device can transmit the music signal SM1 to the control module 180 using a wireless communication technology or a wired communication technology, and the control module 180 further transmits the music signal SM1 to the circuit board 170.

In an embodiment, the first speaker 130 and the second speaker 150 can emit music of different audio frequencies. For example, the first speaker 130 can emit a sound of medium to high frequency (medium to high pitch) of the music signal SM1 (having an audio frequency range of 20 Hz-20 KHz), and the second speaker 150 can emit a sound of low frequency (low pitch) of the music signal SM1. In another embodiment, the first speaker 130 can emit the sound of low frequency (low pitch) of the music signal SM1 and the second speaker 150 can emit the sound of medium to high frequency (medium to high pitch) of the music signal SM1.

The operation of the controller 171 controlling the ultrasonic transmitter 110, the first speaker 130 and the second speaker 150 to emit the ultrasonic wave W1, the first music M1 and the second music M2 is disclosed below.

As indicated in FIG. 2B, the controller 171 emits an ultrasonic control signal SW1. The mixer 172 mixes the ultrasonic control signal SW1 and the music signal SM1 as a mixed signal SM2. The mixed signal SM2, after having been amplified by the amplifier 173, is transmitted to the ultrasonic transmitter 110, the first speaker 130 and the second speaker 150. Since the ultrasonic control signal SW1 of the mixed signal SM2 is a UHF signal, only the ultrasonic transmitter 110 among the ultrasonic transmitter 110, the first speaker 130 and the second speaker 150 can emit the ultrasonic wave W1 according to the ultrasonic control signal SW1 of the mixed signal SM2. The first speaker 130 and the second speaker 150 respectively emit the first music M1 and the second music M2 according to the audio frequencies of the music signal SM1 of the mixed signal SM2, wherein the first music M1 and the second music M2 having different sound effects, such as a medium to high sound effect and a low sound effect.

Figure 3:
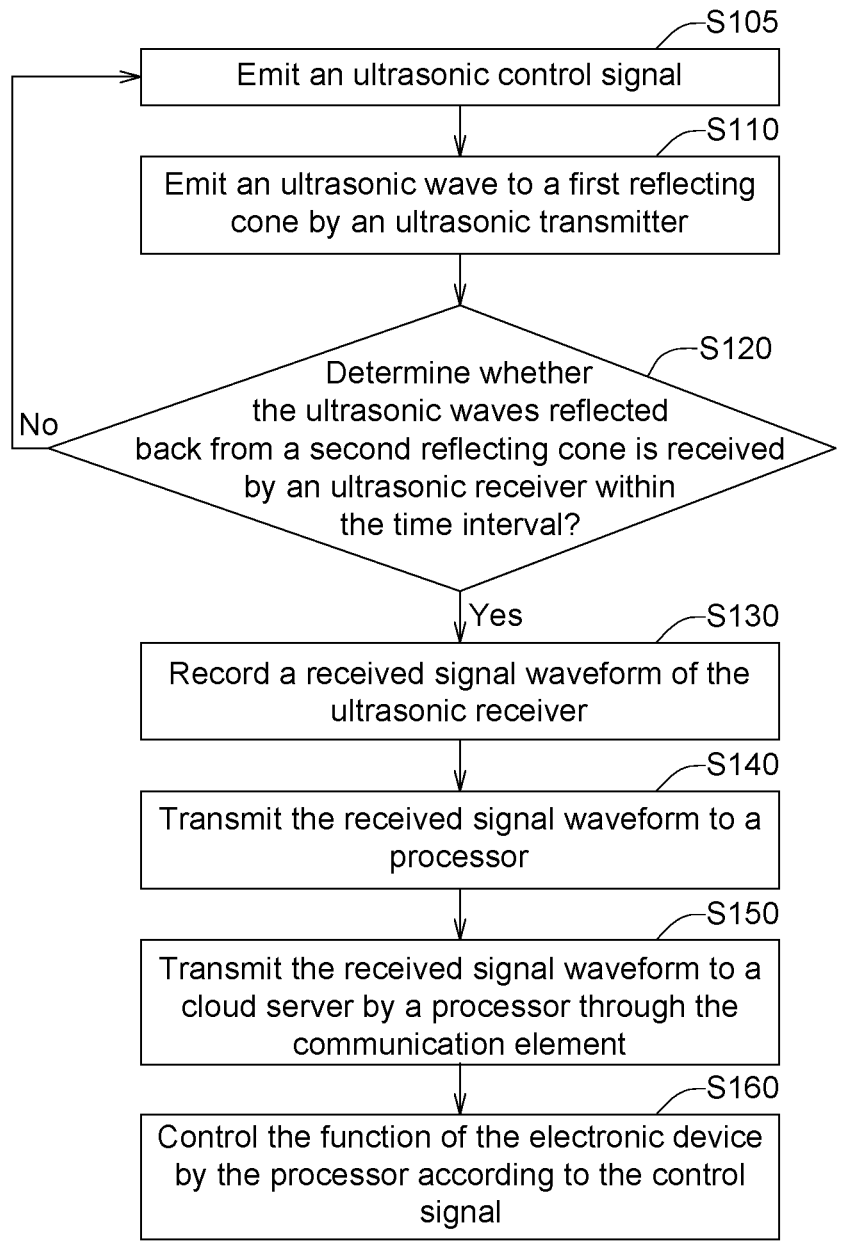
FIG. 3 is a flowchart of an environment detection method of the environment detection device of FIG. 1A.

Referring to FIG. 3, a flowchart of an environment detection method of the environment detection device 100 of FIG. 1A is shown.

In step S105, referring to FIG. 1B, an ultrasonic control signal SW1 is emitted to a mixer 172 by a controller 171. The ultrasonic control signal SW1 is transmitted to an amplifier 173 through the mixer 172, and then is further transmitted to an ultrasonic transmitter 110, a first speaker 130 and a second speaker 150. In another embodiment, in the absence of play music request, the environment detection device 100 can selectively omit the first speaker 130, the second speaker 150 and the mixer 172. Under such design, the ultrasonic control signal SW1 can be directly transmitted to the ultrasonic transmitter 110 without going through the mixer 172.

In step S110, referring to FIG. 1A, an ultrasonic wave W1 is emitted to a first reflecting cone 120s1 by the ultrasonic transmitter 110 according to the ultrasonic control signal SW1. Since the ultrasonic control signal SW1 is a UHF signal, only the ultrasonic transmitter 110 among the ultrasonic transmitter 110, the first speaker 130 and the second speaker 150 can emit the ultrasonic wave W1 according to the ultrasonic control signal SW1.

As indicated in FIG. 1A, the ultrasonic wave W1 is reflected to the environment by the first reflecting cone 120s1 in a full circumferential direction. When the ultrasonic wave W1 contacts the reflecting object B1, the ultrasonic wave W1 is reflected as an ultrasonic wave W2.

In step S120, whether the ultrasonic wave W2 reflected back from a second reflecting cone 140s is received by an ultrasonic receiver 160 within a time interval is determined. If the ultrasonic wave W2 reflected back from the second reflecting cone 140s is received by the ultrasonic receiver 160 within the time interval, then the method proceeds to step S130. The ultrasonic receiver 160 transforms the received ultrasonic wave W1 into the received signal waveform SW2 of FIG. 10. As indicated in FIG. 10, the surge whose voltage is larger the threshold voltage value Vt indicates that the reflected ultrasonic wave W2 is received. If the reflected ultrasonic wave W2 is not received by the ultrasonic receiver 160 within the time interval, then the method proceeds to step S105. Besides, the received signal waveform SW2 received within the time interval may include at least one surge whose voltage is larger than the threshold voltage value Vt.

In step S130, a received signal waveform SW2 of the ultrasonic receiver 160 is recorded by the controller 171. For example, the circuit board 170 may include a memory configured to store the received signal waveform SW2. The memory can be integrated to the controller 171 or can be independent of other elements of the circuit board 170.

In step S140, as indicated in FIG. 1B, the received signal waveform SW2 is transmitted to a processor 181 by the controller 171.

In step S150, as indicated in FIG. 1B, the received signal waveform SW2 is transmitted to the cloud server 10 by the processor 181 through a communication element 182.

The cloud server 10 analyze the received signal waveform SW2 to obtain an environment information of the environment, and further emit a control signal C1 corresponding to the environment information to the processor 181 according to the environment information, as indicated in FIG. 1B.

In step S160, as indicated in FIG. 1B, the function of the electronic device 20 is controlled by the processor 181 according to the control signal C1.

Figure 4:
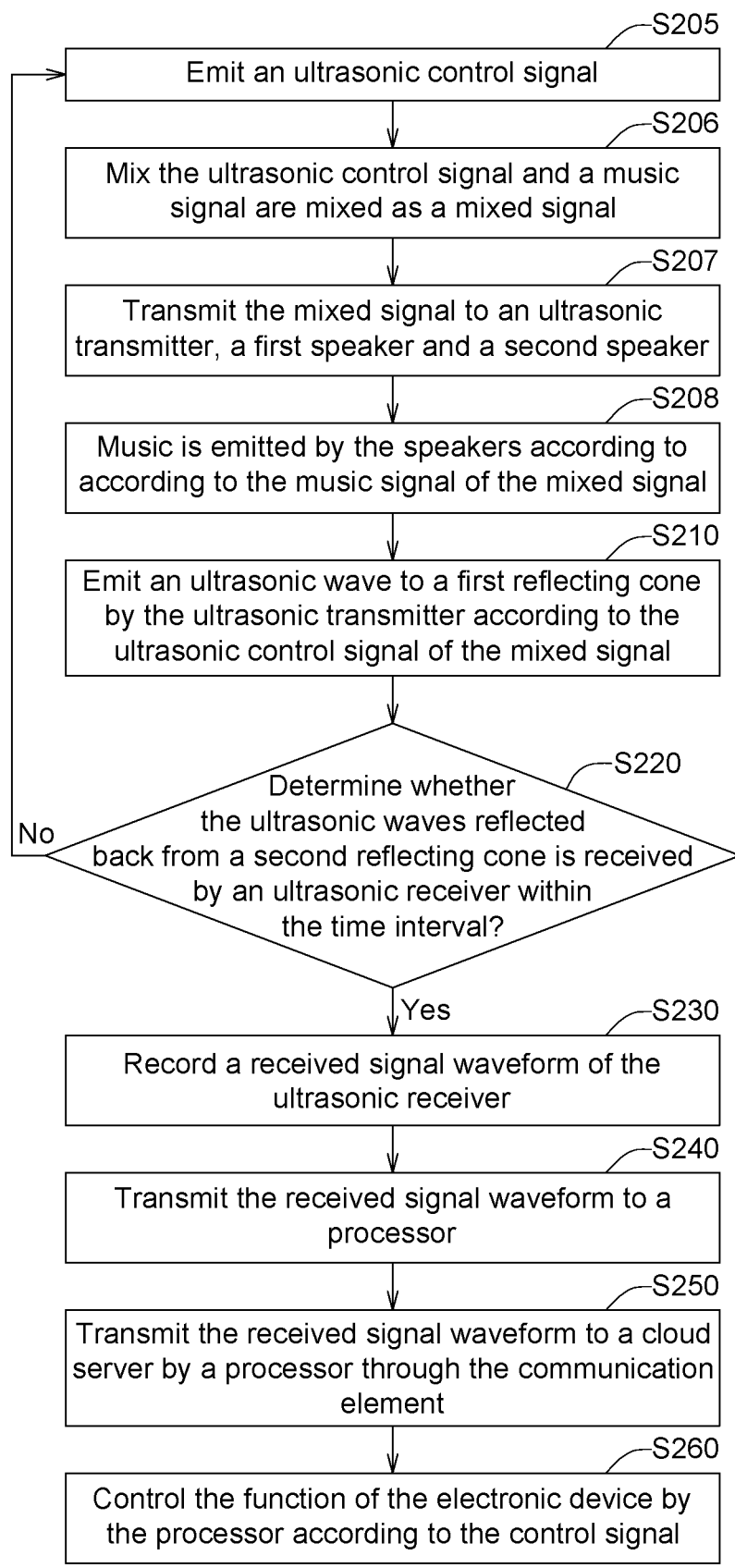
FIG. 4 is a flowchart of an environment detection method of the environment detection device of FIG. 2A.

Referring to FIG. 4, a flowchart of an environment detection method of the environment detection device 100 of FIG. 2A is shown.

In step S205, as indicated in FIGS. 2A and 2B, an ultrasonic control signal SW1 is emitted by a controller 171.

In step S206, as indicated in FIG. 2B, the ultrasonic control signal SW1 and a music signal SM1 are mixed as a mixed signal SM2 by a mixer 172.

In step S207, as indicated in FIG. 2B, the mixed signal SM2, after having been amplified by an amplifier 173, is transmitted to an ultrasonic transmitter 110, a first speaker 130 and a second speaker 150.

In step S208, as indicated in FIG. 2B, a first music M1 and a second music M2 are emitted by the first speaker 130 and the second speaker 150 according to the different audio frequencies of the music signal SM1 of the mixed signal SM2, wherein the first music M1 and the second music M2 respectively are different sound effects, such as a medium to high sound effect and a low sound effect, emitted by the first speaker 130 and the second speaker 150.

In step S210, as indicated in FIG. 2B, an ultrasonic wave W1 is emitted to a first reflecting cone 120s1 by the ultrasonic transmitter 110 according to the ultrasonic control signal SW1 of the mixed signal SM2. Since the ultrasonic control signal SW1 is a UHF signal, only the ultrasonic transmitter 110 among the ultrasonic transmitter 110, the first speaker 130 and the second speaker 150 can emit the ultrasonic wave W1 according to the ultrasonic control signal SW1.

As indicated in FIG. 2A, the ultrasonic wave W1 is reflected to the environment by the first reflecting cone 120s1 in a full circumferential direction. When the ultrasonic wave W1 contacts the reflecting object B1, the ultrasonic wave W1 is reflected as an ultrasonic wave W2.

Descriptions of steps S220-S260 are similar to that of steps S120-S160, and the similarities are not repeated here.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An environment detection device, comprising:
   an ultrasonic transmitter configured to emit an ultrasonic wave;
   a first reflecting member having a first reflecting cone, wherein the first reflecting cone is configured to reflect the ultrasonic wave to an environment in a full circumferential direction;
   an ultrasonic receiver;
   a second reflecting member having a second reflecting cone, wherein the second reflecting cone is configured to reflect the ultrasonic wave reflected back from the environment to the ultrasonic receiver; and
   a controller electrically connected to the ultrasonic receiver and configured to record a received signal waveform of the ultrasonic wave received by the ultrasonic receiver.

2. The environment detection device according to claim 1, the controller further is configured to:
   analyze the received signal waveform to obtain an environment information of the environment.

3. The environment detection device according to claim 2, wherein the electronic device is an electronic element built in the environment detection device or an electronic element disposed outside the environment detection device.

4. The environment detection device according to claim 1, further comprising:
   a processor, wherein the controller further is configured to transmit the received signal waveform to the processor;
   a communication element electrically connected to the processor and configured to transmit the received signal waveform to a cloud server;
   wherein the cloud server is configured to:
   analyze the received signal waveform to obtain an environment information of the environment; and
   emit a control signal corresponding to the environment information to the processor according to the environment information;
   wherein the processor further is configured to control function of an electronic device according to the control signal.

5. The environment detection device according to claim 1, further comprising:
   a first speaker electrically connected to the controller and configured to emit a first music;
   wherein the first reflecting member further has a third reflecting cone, and the third reflecting cone faces the first speaker and is configured to reflect the first music to the environment in a full circumferential direction.

6. The environment detection device according to claim 5, further comprising:
   a second speaker electrically connected to the controller and configured to emit a second music;
   wherein the second reflecting cone faces the second speaker and is configured to reflect the second music to the environment in a full circumferential direction.

7. The environment detection device according to claim 5, wherein the controller emits an ultrasonic control signal;
   wherein the environment detection device further comprises:
   a mixer configured to mix the ultrasonic control signal and a music signal into a mixed signal; and
   an amplifier configured to transmit the mixed signal to the ultrasonic transmitter and the first speaker.

8. An environment detection method, comprising:
   emitting an ultrasonic wave to a first reflecting cone by an ultrasonic transmitter, wherein the first reflecting cone reflects the ultrasonic wave to the environment in a full circumferential direction;
   receiving the ultrasonic wave reflected back from a second reflecting cone by an ultrasonic receiver; and recording the received signal waveform received by the ultrasonic receiver by a controller.

9. The environment detection method according to claim 8, further comprising:

determining whether the ultrasonic wave reflected back from the second reflecting cone is received by the ultrasonic receiver within a time interval;

wherein the step of recording the received signal waveform received by the ultrasonic receiver by the controller comprises: recording the received signal waveform of the ultrasonic receiver by the controller if the ultrasonic wave reflected back from the second reflecting cone is received by the ultrasonic receiver within the time interval;

the environment detection method further comprises: continuously emitting the ultrasonic wave to the first reflecting cone by the ultrasonic transmitter if the ultrasonic wave reflected back from the second reflecting cone is not received by the ultrasonic receiver within the time interval.

10. The environment detection method according to claim 8, further comprising:

analyzing the received signal waveform by the controller to obtain an environment information of the environment.

* * * * *